United States Patent [19]

Rickel et al.

[11] 4,005,882
[45] Feb. 1, 1977

[54] HOSE CONNECTOR FOR AUTOMATIC WASHER

[75] Inventors: William R. Rickel, St. Joseph; Dale Edward Mueller, Benton Harbor, both of Mich.

[73] Assignee: Whirlpool Corporation, Benton Harbor, Mich.

[22] Filed: July 21, 1975

[21] Appl. No.: 597,661

[52] U.S. Cl. .............................. 285/194; 285/158; 285/319; 285/DIG. 22; 285/23
[51] Int. Cl.² .......................................... F16L 5/00
[58] Field of Search ........... 285/158, 162, DIG. 22, 285/319, 192, 193, 194, 23

[56] References Cited
UNITED STATES PATENTS

| | | | |
|---|---|---|---|
| 764,395 | 7/1904 | Sweed et al. | 285/319 X |
| 951,889 | 3/1910 | Tener | 285/319 |
| 1,224,611 | 5/1917 | Carrier | 285/319 X |
| 1,384,332 | 7/1921 | Mullenux | 285/DIG. 22 |
| 2,496,938 | 2/1950 | Friedman | 285/158 X |
| 3,245,703 | 4/1966 | Manly | 285/319 |
| 3,328,054 | 6/1967 | Fecho | 285/194 |
| 3,684,321 | 8/1972 | Hundhausen et al. | 285/319 X |
| 3,746,373 | 7/1973 | Prudente | 285/319 X |

Primary Examiner—G. V. Larkin
Attorney, Agent, or Firm—Hill, Gross, Simpson, Van Santen, Steadman, Chiara & Simpson

[57] ABSTRACT

A unitary hose connector made of plastic material and having multiple locking means mounted through the back panel of an automatic washing machine without the use of tools or additional fastening means in either of two locked positions. In the first or "shipping" position the connector is positively locked to the back panel of the machine almost entirely within the machine cabinet. In the second or "installed" position the connector is positively locked to the back panel with an end portion of the connector projecting out of the cabinet to be accessible for coupling with a water inlet hose from an external water source.

19 Claims, 6 Drawing Figures

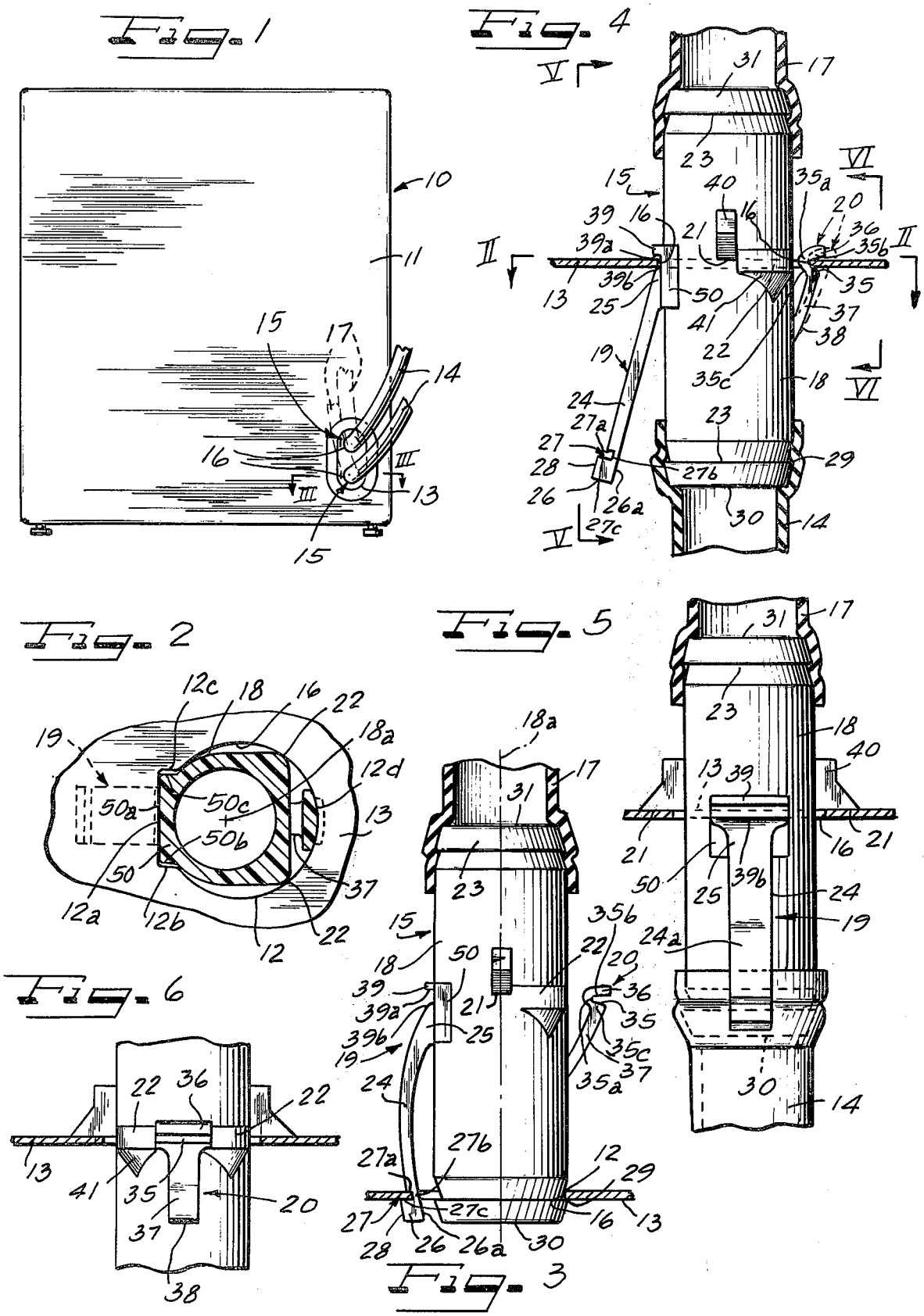

HOSE CONNECTOR FOR AUTOMATIC WASHER

BACKGROUND OF THE INVENTION

1. Field of the Invention

This invention relates to hose connection means for connecting the internal plumbing of a machine to an external source.

2. Description of the Prior Art

In many domestic appliances fluids must be supplied to and delivered from the interior of the machine cabinet. In the washing machine art, for example, hoses which extend through apertures formed in the wall panels of the machines are employed to supply water into the machine and to circulate and drain the laundry liquid. Often in the prior art, the hoses themselves have been extended through the wall panel, exposing them to rubbing and wear on the edges of the panel aperture. Hose connectors have been employed, whereby an interior hose is attached to a connector at the factory and an exterior hose can be attached to the connector entirely from outside the cabinet for installation of the appliance in the field.

U.S. Pat. No. 3,328,054, assigned to the assignee of the present invention, shows both straight and angled hose connectors for mounting through the back panel of an automatic washer, wherein the body of each connector includes a rim and shoulder arrangement and a resilient locking arm which cooperate to lock the connector in its installed position on the back panel of the machine.

SUMMARY OF THE INVENTION

A one-piece integral hose connector for an automatic washing machine has a pair of integral resilient locking arms notched at their free ends to engage a portion of the wall of the machine which defines an aperture through which the connector is mounted. One arm locks the connector in a first or retracted position for packaging and shipment of the machine. The other arm locks the connector in a second or extended position wherein it is accessible for connection of a supply hose thereto during installation of the machine. The connector is slidable from the first to the second position easily and without tools when a tab on the first arm is depressed to disengage its notch from the panel, and the connector is pulled outwardly from the cabinet by its exposed end. The hose connector of the present invention, while retractable into the machine cabinet to facilitate packaging of the machine for shipment, eliminates any need for the customer or installer to open the top or back of the machine to make a hose connection during installation and prevents wear and abrasion to hoses and hose connectors from panel edges around the aperture in the panel during shipment and operation of the machine.

BRIEF DESCRIPTION OF THE DRAWINGS

FIG. 1 is a general elevational view of the rear panel of a washing machine employing the present invention, showing the location of hoses and connectors.

FIG. 2 is a section view taken along line II—II in FIG. 4 with the hose connector of the present invention shown in its extended or installed position.

FIG. 3 is a fragmentary cross-sectional view taken on line III—III in FIG. 1 with the hose connector of the present invention shown disposed in its retracted or shipping position.

FIG. 4 is a view similar to FIG. 3 but showing the hose connector in its installed or operating position.

FIG. 5 is a side view of the hose connector in its installed position taken on line V—V of FIG. 4.

FIG. 6 is a side view of the central portion of the hose connector taken on line VI—VI of FIG. 4.

DESCRIPTION OF THE PREFERRED EMBODIMENT

On the drawings, a washing machine is shown generally at 10, having a rear panel 11. The panel 11 near the lower right-hand corner has a recessed hose connection panel 13 through which one or more hoses such as hot and cold water hoses 14,14 are connected to the interior of the automatic washer 10 through hose connectors 15,15 which are mounted within apertures 16,16 formed in the recessed panel 13. The hose connectors 15 communicate behind or inwardly of the panel 11 with washing machine interior conduits or hoses 17,17.

Each connector 15 comprises (see FIG. 2) a hollow and generally cylindrical body or tube portion 18 having a central axis 18a. The connector 15 is provided with first and second arms or locking bars 19 and 20 each extending outwardly from the main body of the tube 18 of the hose connector 15, and the tube 18 is also provided on its external surface with two diametrically opposed outwardly projecting shoulders 21, 21 and a pair of abutments 22, 22 projecting outwardly side-by-side from one half of its periphery. Each end of the tube or body portion 18 is formed as a conventional hose connector means 23, having one or more circumferential ribs for accepting a flexible hose 14 or 17 in fluid-tight engagement therewith. At the factory, an interior hose 17 is connected to the connection means 23 on an inward end 31 of the tube or body portion 18 of the connector 15.

FIG. 3 shows the hose connector 15 locked by first locking means in a first position (which is also referred to herein as the storage position, the retracted position, or the factory position) with respect to the recessed panel 13, in accordance with the principles of the present invention.

The first locking means comprises an arm or locking bar 19 having an inwardly deflectable resilient shaft-like portion 24 which is flexible in a radial direction with respect to the tube axis 18a. In a preferred form of the hose connector the first locking means is integral with the tube 18 and one end 25 of the resilient shaft 24 is fixed to the tube 18. In its free state the shaft 24 is arranged to extend in an inclined position with respect to the tube body 18 as best shown in FIG. 4. The distal or free end 26 of the shaft 24 terminates in a finger or latch portion which includes a notch 27 having bottom, inner, and outer walls 27a, 27b, and 27c, respectively (FIG. 3). Outwardly of the notch 27 is a release tab surface 28 which can be gripped manually.

With the locking bar 19 in its free position the bottom wall 27a of notch 27 is spaced from a cooperating opposing groove portion 29 defined by a circumferential rib of the connector means 23 by a distance which is greater than the corresponding dimension of the aperture 16 in the panel 13.

Thus, when the hose connector 15 is in its first or factory position (FIG. 3), the shaft 24 will be flexed inwardly and the connector 15 will be firmly held by perimeter portions 12 of the aperture 16 between the notch 27 and the diametrically opposite surface of groove portion 29, with a pre-load force on the resilient shaft 24 to secure the connector 15 against displacement from its first position. An outer end portion 30 of the connector and the release tab 28 of the first locking bar 19, will protrude only slightly outside the hose connection panel 13, and will not extend beyond the rear panel 11 of the washing machine 10. Connector 15 and aperture 16 are sized such that in the factory position of the connector sufficient space is provided between the inner surface 26a of the free end 26 of the first locking bar 19 and the tube 18 to allow disengagement of the inner shoulder 27b of the notch 27 from the perimeter portion 12 of the panel 13. Thus the shaft 24 may be flexed radially inwardly to release the first locking means by applying a manual gripping force between the tab 28 and the body of the connector to squeeze them together, thereby permitting movement of the connector 15 outwardly from the machine 10.

FIG. 4 shows the hose connector 15 locked by second locking means in its second position (also referred to herein as the extended position, the operating position, the utilitarian or the installed position) with the body 18 protruding a substantial distance outwardly from the recessed panel 13 into an accessible position, and an exterior hose 14 connected to the connection means 23 at the outer end 30 of the tube 18. As shown in FIG. 4, the connector 15 has been moved from its first locked position engaged between the notch 27 and the cooperating opposing groove portion 29 of the connector means 23 to the second locked position.

The second locking means includes a bar 20 having a inwardly deflectable resilient shaft 37 which is considerably shorter than the arm 24, and the locking bar 20 also includes a free end or finger 36 providing a latch formed by a notch 35 which has bottom, inner, and outer wall portions 35a, 35b, and 35c, respectively, to engage one side of the perimeter portion 12 of the aperture 16. The shaft or arm 37 is attached at its opposite end 38 to the tube 18. It will be noted that the locking bars 19 and 20 are on opposite sides of tube 18 and extend in opposite directions, i.e., the shaft 24 extends generally in one direction and the shaft 37 extends in the opposite direction, with the two shafts and the axis of the tube 18 lying generally in the same plane; and the finger portions of the shafts 24 and 37, i.e., those portions that function as latches, are aligned in a prescribed oppositely-facing relationship. Diametrically opposite the notch 35 in the second locking bar 20 is a raised portion 50 having a shoulder 39 formed adjacent the attachment area 25 of the first locking bar 19. This shoulder 39 includes an outwardly projecting ledge 39a (see FIG. 4) so that with the connector locked in the second position a part of the perimeter portion 12 of the aperture 16 will be trapped in the space formed between the ledge 39a and a generally inwardly-facing surface 39b of the arm 19 adjacent the attachment area 25.

Each of the shoulders 21, 21 is formed and supported axially by a web 40 attached to the wall of the tube 18. These shoulders 21, 21 are positioned on opposite side portions of the body 18 and are outwardly facing in the axial direction and proportioned so as to prevent the connector 15 from being completely withdrawn through the aperture 16 in the panel 13. The abutments 22, 22 are spaced from the tube axis 18a to contact the perimeter portion 12 of aperture 16 adjacent the notch 35 on either side thereof when the connector 15 is in the second position. Each of the abutments 22, 22 is supported by a web 41 attached to the tube 18, and each of the webs forms a ramp portion leading from the tube 18 outwardly along the connector 15 to the surface 22. The purpose of these radial abutment surfaces is to prevent a camming or cocking of the connector 15 while in its second position and prevent a tipping of the connector which might allow perimeter portion 12d of the aperture 16 to slip over the wall portion 35b of notch 35.

Because the second bar 20 has a relatively short resilient shaft portion 37, the bar 20 is relatively stiffer than is the first locking bar 19. Thus, the bar 20 will have a relatively higher preloading force when it is deflected a given distance as compared to the preloading of the first locking bar 19. The end 36 of the locking bar 20 is spaced a distance from the body portion 18 in its engaged position as shown in FIG. 4 sufficient to allow the panel 13 to clear the outer shoulder 35c when the connector 15 is moved axially into or out of the installed position.

It should be noted that the perimeter portion 12 of the aperture 16 in the panel includes a portion which substantially defines 3 sides of a rectangle to provide a side edge surface 12a of aperture 16 and adjacent edge surfaces 12b and 12c. The resilient shaft portion 24 of locking arm 19 has a substantially rectangular cross section including a generally flat ramp surface 24a (FIG. 5) which is designed to slide against the edge 12a of the aperture 16. Contact between surface 24a and edge 12a is substantially maintained, as the connector 15 is moved between first and second positions, by the natural bias of the resilient arm 19, and edge surfaces 12b and 12c act as stops to limit lateral movement of the arm with respect to the edge surface 12a. Roll and yaw of the connector 15 with respect to the axis 18a are thus substantially limited while the connector moves between its first and second positions.

It should also be noted that roll and yaw movement of the connector 15 with respect to its axis 18a when in the second position is substantially prevented by the interaction of raised portion 50 on body 18 with the rectangular portion of the aperture 16. The raised portion 50 is generally rectangular in cross section and includes an upwardly facing surface 50a and a pair of side surfaces 50b and 50c. As best seen in FIG. 2, surfaces 50a, 50b, and 50c of portion 50 cooperate with the generally corresponding surfaces 12a, 12b, and 12c of aperture 16 to substantially prevent roll and yaw movement of the connector 15 and, in combination with the cooperating surfaces 39a and 39b, the latch formed by notch 35, and the radially outward biasing force applied by the locking bar 20, hold the connector firmly in place on the panel 13.

In operation, workers on the assembly line at the factory attach the interior hose 17 to the connector means 23 on the inner end 31 of the tube 18 of the hose connector 15. Then the connector 15 is positioned inwardly of the aperture 16 in the hose connection recess panel 13, the first locking bar 19 compressed radially inwardly at its free end 26, and the connector 15 inserted into the aperture 16 in the panel 13 until the outer wall 27c of notch 27 is outward of the panel 13 so that the notch 27 engages the panel 13 along surface 12a to press the tube 18 against the opposite edge of the aperture 16 at the cooperating opposing groove portion 29 of the connector means 23. Since the hose connector 15 is almost entirely within the machine cabinet it will not be exposed to the danger of external impact or other undesirable contact and therefore is not susceptible to damage during shipping or handling of the washing machine. Since the locking bar 19 holds the connector 15 firmly positioned within the aperture 16, there is little or no opportunity for abrading the connector 15 or the internal hoses 17.

When the machine 10 is uncrated and installation is desired the installer will first (before attaching the hoses 14 from the water supply) depress the release tab 28 toward the tube 18, as by squeezing together the release tab 28 and the end 30 of the tube or connector body 18. Once the inner wall 27b of the notch 27 clears the surface 12a of perimeter portion of the panel 13, the connector 15 is pulled outwardly from the machine with surface 12a of panel 13 sliding along the ramp formed by surface 24a of the resilient shaft 24 and an opposite portion 12d of perimeter portion 12 of panel 13 sliding along a wall portion of the tube 18 until it reaches the attached end 38 of the resilient shaft 37. Further withdrawal of the connector 15 from the panel 13 will shift the connector 15 transversely within the aperture 16, as the surface 12d slides along an outwardly-sloping ramp formed by the shaft 37 of arm 20 until the panel 13 is captured by the recess or notch 35. At the same time portion 12a of perimeter portion 12 continues to slide along the ramp surface 24a of arm 19 until stopped by the shoulder 39. In this position the shoulder 21 will contact the interior side of the panel 13 and the abutments 22 will each engage a part of perimeter portion 12 of panel 13. Since in this position the resilient shaft 37 will not return fully to its free position when the edge of aperture 16 is engaged in the notch 35, a preloading force will remain against the bottom surface 35a of the notch 35. The installer may then install the supply hose 14 over the connector means 23 on the outer end 30 of the tube 18.

Should the washing machine 10 thereafter need to be moved, as to a new residence, the second locking bar 20 may be compressed radially inwardly to disengage the notch 35 from the panel 13, and the connector 15 slid inwardly through aperture 16 of the panel 13 until the notch 27 on the first locking bar 19 again engages the panel 13 in a retracted position.

The invention thus provides a relatively low cost, unitary hose connector for an appliance which can selectively be locked in either of two positions without the use of tools or additional fastening means.

Although various minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A panel mounted hose connector selectively movable between a first retracted position and a second extended position, comprising:
   a generally hollow, elongate cylindrical body forming a passage for conducting fluid and adapted to be positioned in an aperture defined by a panel wall;
   first and second locking means connected to said body and each comprising,
   an elongated resilient shaft angled outwardly from said connector body and yieldable radially inwardly toward said body along the length of said shaft from an unstressed position to a position contacting said connector body,
   each said shaft being notched adjacent the free end thereof to form a latch for engaging said panel wall adjacent the perimeter of said aperture and locking the connector in one of said first and second positions; and
   the free ends of the shafts being spaced longitudinally of said body.

2. A panel mounted hose connector as defined in claim 1, wherein one of said locking means further has a release tab formed on the free end of said shaft, said tab extending into an accessible position to allow manual engagement thereof for radially inward movement toward said body by deflection of the resilient shaft, thereby disengaging the latch from said panel wall.

3. A hose connector as defined in claim 1, further comprising abutment means formed on said connector body for engaging an adjoining surface of the panel wall upon movement of said connector from said first position into said second position.

4. A panel mounted hose connector comprising:
   a tube having an axis and a generally cylindrical wall adapted to pass through an apertured panel wall and having first and second ends respectively outwardly and inwardly of said panel wall,
   a connecting means at each respective end of said tube to which a hose may be affixed, and
   integral first and second locking means each having a notch formed in a free end thereof and the notches being spaced longitudinally along said tube for securing said hose connector respectively in a first storage position and in a second utilitarian position,
   said first locking means comprising a first locking bar having
      a fixed end attached to said tube wall intermediate the ends of said tube,
      a resilient shaft extending angularly outwardly from said tube wall in a plane generally including the axis of the tube, and
      said free end bearing said notch and forming a latch,
   said latch being engageable with the panel wall and aligned axially with an opposing surface of one of said connecting means at the first end of the tube to lock said hose connector to the panel wall by radially outward clamping forces applied by the resilient shaft by being removable therefrom by application of an opposing manual squeezing force to disengage the latch 5. A panel mounted hose connector comprising:
   a tube having an axis and a generally cylindrical wall adapted to pass through an apertured panel wall and having first and second ends respectively outwardly and inwardly of said panel wall,
   a connecting means at each respective end of said tube to which a hose may be affixed, and
   integral first and second locking means for securing said hose connector respectively in a first storage position and in a second utilitarian position,
   said first locking means comprising a first locking bar having
      an end affixed to said tube wall intermediate the ends of said tube,
      a resilient shaft extending angularly outwardly from said tube wall in a plane generally including the axis of the tube, and
      a notched free end forming a latch,
   said second lock means comprising:

means forming a shoulder intermediate the ends of said tube engageable with an adjoining surface of said panel in said second position, an axially outwardly-facing shoulder formed by a portion of said affixed end of said first locking bar and generally aligned with said abutment so as to be engageable with said panel in said second position, a plurality of abutments spaced outwardly from the tube axis and engageable with adjoining surfaces of said panel aperture, and a second locking bar having an end affixed to an outer surface of said tube wall intermediate its ends, a resilient shaft extending angularly outwardly from said tube wall in a plane generally including the tube axis and in a direction generally toward the inward end of said tube, said shaft being deflectable from an unstressed position to a stressed position to accommodate axial movement of the tube, and a notched free end forming a latch, said latch being engageable with the panel and generally aligned axially with said axially outwardly-facing shoulder to lock the tube in the said second position 6. A panel mounted hose connector as defined in claim 5, further defined by:

each said latch formed by each corresponding notched end having surfaces engageable with the panel wall, each said latch being aligned axially with the abutments, the bottom surface of each said latch being spaced radially in the unstressed state of the bar at a distance from said axis somewhat greater than the radial distance of said abutments from said axis, to effect a preloading of said bar in its locked position, and the inner surface of the notch forming an axial stop means.

7. A panel mounted hose connector as defined in claim 6, further comprising an alignment ramp formed by said shaft of said first locking means extending outwardly and longitudinally from the wall of the tube substantially to the axially outwardly-facing shoulder of said affixed end of said first locking means.

8. A panel mounted hose connector as defined in claim 7, further defined by the hose connector comprising a unitary article of manufacture made of resilient plastic material so that said tube is relatively rigid and said shafts are relatively elastic and flexible.

9. A unitary hose connector made of plastic material and having multiple locking means for mounting through the back panel of an automatic washing machine without the use of tools or additional fastening means in either of two locked positions, comprising:

a generally tubular body forming a fluid passage adapted to extend through an aperture defined by the back panel of the machine and having hose couplings at opposite ends thereof;

first and second arms connected to said body intermediate its ends and extending in opposite axial directions and each having a finger at the end thereof forming a latch for engaging the edges of the apertured panel at different axial positions of adjustment, thereby to lock the connector in a first retracted storage position and a second projecting utilitarian position.

10. A unitary hose connector as defined in claim 9, and further characterized by shoulder means projecting radially outwardly of the tubular body and disposed in axial alignment with one of said latches to clamp the tubular body in firm assembly with the back panel.

11. A unitary hose connector as defined in claim 10, wherein said arms are elastically flexible so that said latches may be actuated for shifting the connector selectively between positions.

12. In an appliance having a cabinet, at least one hose internal to said cabinet, and an aperture defined in a panel of said cabinet; a hose connector for connecting a hose external to said cabinet in fluid communication with said internal hose, said hose connector comprising:

a generally tubular body for extending through said aperture and providing a fluid passageway between said internal and external hoses, said body including connection means at opposite ends thereof for receiving respective internal and external hoses;

first inwardly deflectable arms means connected to said body and cooperable with one of said connection means to releasably lock said body in a first retracted position with respect to said panel; and second inwardly deflectable arm means connected to said body and cooperable with a surface of said body to releasably lock said body in a second extended position with respect to said panel.

13. In an appliance as claimed in claim 12 wherein said first and second deflectable arm means each define a latch at the distal end thereof for engaging said panel adjacent said aperture.

14. In an appliance as claimed in claim 12 wherein shoulder means are provided on said body for engaging an inwardly facing surface of said panel with said hose connector in said second position.

15. In an appliance as claimed in claim 12 wherein abutment means are provided on said body for engaging a surface of said panel adjacent the perimeter of said aperture.

16. In an appliance as claimed in claim 12 wherein said first deflectable arm means defines a generally inwardly facing surface adjacent the connection of said first arm means to said body and a shoulder portion including an outwardly facing surface is provided on said body spaced from and in proximity to said generally inwardly facing surface, whereby said outwardly and generally inwardly facing surfaces cooperate with each other and with said second arm means to locate said hose connector axially with respect to said panel with said hose connector in said second position.

17. In an appliance as claimed in claim 16 wherein said space between said outwardly and said generally inwardly facing surfaces adjacent said shoulder portion is partially defined by a portion of the body generally rectangular in cross section including an upwardly facing surface and a pair of side surfaces and wherein said aperture includes a portion of generally corresponding rectangular dimension, whereby said side surfaces cooperate with said panel to resist yaw movement of said hose connector with respect to said panel and said upwardly facing surface cooperates with said panel to resist roll movement of said hose connector with respect to said panel.

18. In an appliance as claimed in claim 17 wherein said first deflectable arm means includes surfaces defining a ramp for sliding engagement with said rectangular portion of said aperture as said hose connector is moved between said first and second positions, whereby said sliding engagement generally limits roll and yaw movement of said hose connector with respect to said panel as said hose connector is moved between said first and second position.

19. In an appliance as claimed in claim 18 wherein said first and second arm means extend in generally opposite directions from said body in a generally common plane including the axis of said body, and wherein said second deflectable arm means includes a surface defining a ramp for sliding engagement with a panel surface adjacent said aperture, said ramp surfaces of said first and second arm means forming generally equal but opposite angles with said body portion so as to provide a controlled transverse movement of said hose connector with respect to said panel when panel surfaces adjacent said aperture contact both said ramps simultaneously as said hose connector moves between said first and second position.

* * * * *